No. 811,925.
PATENTED FEB. 6, 1906.
I. JACKSON.
FASTENING DEVICE.
APPLICATION FILED MAY 17, 1905.
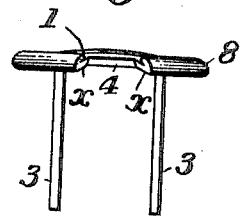
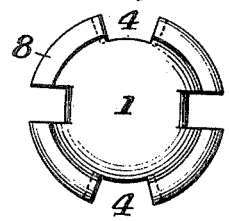
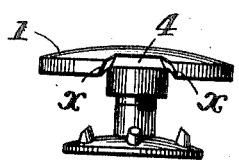 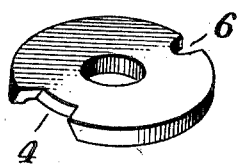
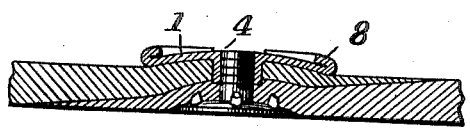
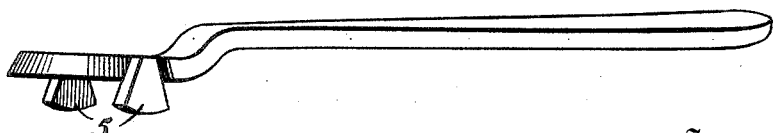
Witnesses
J. G. Stinkel
B. C. Rust
Inventor
Isaac Jackson
by Foster, Freeman & Watson
Attorneys

UNITED STATES PATENT OFFICE.

ISAAC JACKSON, OF GLOSSOP, ENGLAND.

FASTENING DEVICE.

No. 811,925.   Specification of Letters Patent.   Patented Feb. 6, 1906.

Application filed May 17, 1905. Serial No. 260,917.

*To all whom it may concern:*

Be it known that I, ISAAC JACKSON, a subject of the King of Great Britain, residing at Glossop, in the county of Derby, England, have invented certain new and useful Improvements in Fastening Devices, of which the following is a specification.

In certain classes of fasteners it is desirable to use parts or members of light thin material readily bent and yet which must be turned sometimes under great resistance in order to detach said parts or members, and even in cases where the parts or members are of heavier material they sometimes become set or fixed in place, so that they can only be turned by the application of great force. It therefore frequently results with fasteners as ordinarily constructed—say the thin metal heads of rivets—that the head itself is bent or broken in attempting to detach it, or in the case of nuts or washers of heavier material they adhere so firmly in place, owing to corrosion, that it is difficult to turn them by ordinary means. To overcome these objections, I provide this part or member of the fastener to be turned with slots or openings so formed as to present edges acutely inclined to the plane of the said part, and thus secure a bite or proper hold with a tool suitable for turning the part, as fully set forth hereinafter and as illustrated in the accompanying drawings, in which—

Figure 1 is a side elevation showing in part section one form of fastener embodying my invention; Fig. 2, a plan of the device of Fig. 1; Fig. 3, an elevation showing another form of fastener embodying the invention; Fig. 4, a perspective view showing my invention in connection with a washer; Fig. 5, a section showing one manner in which the device is applied, and Fig. 6 a perspective view of a tool for operating with the fastener. Fig. 7 is a sectional view of the nut shown in Fig. 4.

As shown in Figs. 1 and 2, the head 1 of the fastener is of thin metal with prongs 3 3, which are clenched after being inserted in the material to which the fastener is applied. My method of detaching such fasteners is to turn or rotate the head, thus so bending the prongs as to break or twist them out of the material. As the fasteners are usually constructed the effort to turn the heads is apt to bend and distort the leather without breaking the connection with the prongs. To secure a strong hold on the tool, I provide the head 1 with notches or openings 4, which have edges *x x* inclined to the general plane of the head, so that when a tool B, Fig. 6, with lugs 5 5 is applied with the lugs in the openings a firm hold upon the head will be secured and then great power can be applied to the head to turn the same, insuring its detachment.

In the construction shown in Fig. 3 the part to be turned is practically a nut and of heavier material than shown in Fig. 1; but in many instances such nuts (as in belt-fasteners) become corroded or rusted and adhere so firmly in place that it is difficult to turn them. By providing the openings having inclined faces to receive lugs in the tool the turning of the latter causes the lugs to so bite the faces that no slippage is possible and the tool is securely held to the head and the turning of the head secured.

The reverse inclines can be at opposite sides of one recess or opening in the head, as shown with a washer in Fig. 4, in which case the tool has one lug 5 and a pin to fit a notch 6 in the head.

In order to strengthen the thin plate between the notches or bearing-faces, I turn up the head at the periphery, forming edge ribs 8, (see Figs. 1 and 5,) which greatly strengthen the head, so as to resist the strain in turning and also present rounded edges, which prevent cutting the material, as well as facilitating the passage of the fastener over any obstructions

What I claim is—

1. A fastener comprising a relatively thin plate adapted to be secured or released by a rotary motion, said plate having openings for engagement with the lugs of a key, that wall of at least one of the openings which is to be engaged by the key-lug being undercut, substantially as described.

2. A fastener comprising a relatively thin plate adapted to be secured or released by a rotary motion, said plate having openings therethrough provided with undercut walls, substantially as described.

3. A fastener having openings 4, and bent up at the edge between the openings to form rounded ribs, substantially as described.

In testimony whereof I have signed my name to this specification in the presence of two subscribing witnesses.

ISAAC JACKSON.

Witnesses:
 ARTHUR L. BRYANT,
 THOS. HOWE.